US012054162B2

(12) United States Patent
Laine et al.

(10) Patent No.: US 12,054,162 B2
(45) Date of Patent: Aug. 6, 2024

(54) METHOD AND A CONTROL UNIT FOR DETERMINING A PARAMETER INDICATIVE OF A ROAD CAPABILITY OF A ROAD SEGMENT SUPPORTING A VEHICLE

(71) Applicant: VOLVO TRUCK CORPORATION, Gothenburg (SE)

(72) Inventors: Leo Laine, Härryda (SE); Mats Jonasson, Partille (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 394 days.

(21) Appl. No.: 17/594,152

(22) PCT Filed: Apr. 5, 2019

(86) PCT No.: PCT/EP2019/058711
§ 371 (c)(1),
(2) Date: Oct. 4, 2021

(87) PCT Pub. No.: WO2020/200483
PCT Pub. Date: Oct. 8, 2020

(65) Prior Publication Data
US 2022/0172492 A1 Jun. 2, 2022

(51) Int. Cl.
*B60W 50/00* (2006.01)
*B60W 30/14* (2006.01)
(Continued)

(52) U.S. Cl.
CPC ...... *B60W 50/0097* (2013.01); *B60W 30/143* (2013.01); *G06T 7/90* (2017.01);
(Continued)

(58) Field of Classification Search
None
See application file for complete search history.

(56) References Cited

U.S. PATENT DOCUMENTS 9,139,204 B1 9/2015 Zhao et al.
9,460,613 B1 * 10/2016 Whiting ............... G06V 10/764
(Continued)

FOREIGN PATENT DOCUMENTS

CN 105270263 A 1/2016
CN 105894843 A 8/2016
(Continued)

OTHER PUBLICATIONS

Korean Office Action dated Jun. 27, 2023 in the corresponding Korean Patent Application No. 10-2021-7035342, 7 pages.
(Continued)

*Primary Examiner* — Redhwan K Mawari
(74) *Attorney, Agent, or Firm* — Venable LLP; Jeffri A. Kaminski (57) ABSTRACT

The invention relates to a method for determining a parameter indicative of a road capability of a road segment (16) supporting a vehicle (10). The vehicle (10) comprises a sensor (18) adapted to generate an information package on the basis of signals (20, 22) reflected from the surface of a portion of the road segment (16) in front of the vehicle (10), as seen in an intended direction of travel of the vehicle (10). The vehicle (10) further comprises a plurality of ground engaging members (12, 14). The method comprises: —determining a reference content measure indicative of the information content of an information package supplied by the sensor (18) at a reference time instant (T1); —comparing the reference content measure to a previous content measure indicative of the information content of an information package supplied by the sensor (18) at a previous time instant (T0), the previous time instant (T0) occurring before the reference time instant (T1); —upon detecting that a difference between the reference content measure and the previous content measure is outside a predetermined toler-
(Continued)

ance range, allowing the execution of a determination procedure for determining the parameter indicative of the road capability of the road segment (16) supporting the vehicle (10); —upon detecting that the difference between the reference content measure and the previous content measure is within the predetermined tolerance range, not allowing the execution of the determination procedure, and —wherein the determination procedure comprises modifying the operation of one or more of the ground engaging members (12, 14).

26 Claims, 3 Drawing Sheets

(51) Int. Cl.
  *G06T 7/90* (2017.01)
  *G06V 10/50* (2022.01)
  *G06V 20/56* (2022.01)
(52) U.S. Cl.
  CPC ............ *G06V 10/50* (2022.01); *G06V 20/588* (2022.01); *B60W 2420/403* (2013.01); *B60W 2552/40* (2020.02); *B60W 2555/20* (2020.02); *B60W 2720/106* (2013.01); *B60W 2720/30* (2013.01); *G06T 2207/10024* (2013.01); *G06T 2207/30256* (2013.01)

(56) References Cited

U.S. PATENT DOCUMENTS

| | | | | |
|---|---|---|---|---|
| 11,410,411 B2* | 8/2022 | Yao | ...................... | G06V 40/103 |
| 11,567,190 B2* | 1/2023 | Ben Khadhra | ......... | G01S 7/412 |
| 11,689,707 B2* | 6/2023 | Paolella | ............... | H04N 13/246 |
| | | | | 348/42 |
| 11,749,104 B2* | 9/2023 | Choi | ................ | G08G 1/096783 |
| | | | | 340/944 |
| 11,802,968 B2* | 10/2023 | Gupta | ................... | G08G 1/0129 |
| 2004/0138831 A1* | 7/2004 | Watanabe | ............. | B60T 8/1725 |
| | | | | 702/33 |
| 2014/0212081 A1* | 7/2014 | Takahashi | ............. | G01L 5/0019 |
| | | | | 384/448 |
| 2015/0224925 A1 | 8/2015 | Hartmann | | |
| 2017/0010109 A1* | 1/2017 | Hayon | ............. | G08G 1/096805 |
| 2017/0286763 A1* | 10/2017 | Fukuda | .................. | H04N 7/188 |
| 2018/0121743 A1* | 5/2018 | Ali | ......... | G06T 7/0004 |
| 2018/0165529 A1* | 6/2018 | Ishigami | .............. | G08G 1/0962 |
| 2018/0194286 A1* | 7/2018 | Stein | ........................ | G06N 3/04 |
| 2019/0120721 A1* | 4/2019 | Suzuki | .................... | B60C 19/00 |
| 2020/0049497 A1* | 2/2020 | Suzuki | ............... | B60W 40/068 |
| 2022/0178686 A1* | 6/2022 | Suzuki | ................... | G01B 17/08 |

FOREIGN PATENT DOCUMENTS

| | | | |
|---|---|---|---|
| CN | 108334819 A | 7/2018 | |
| DE | 102016118488 A1 | 4/2017 | |
| FR | 3070349 A1 * | 3/2019 | ............ B60W 30/16 |
| JP | 2002536659 A | 10/2002 | |
| JP | 2004168286 A | 6/2004 | |
| JP | 2010060299 A | 3/2010 | |
| JP | 2011174794 A | 9/2011 | |
| JP | 2015143979 A | 8/2015 | |
| JP | 2017128191 A | 7/2017 | |
| JP | 2017182757 A | 10/2017 | |
| WO | 2018234055 A1 | 12/2018 | |

OTHER PUBLICATIONS

Japan Office Action dated Feb. 24, 2023 in corresponding Japan Patent Application No. 2021-559132, 10 pages.
China Office Action dated Feb. 17, 2022 in corresponding China Patent Application No. 201980095138.5, 9 pages.
International Search Report and Written Opinion dated Jan. 24, 2020 in corresponding International PCT Application No. PCT/EP2019/058711, 9 pages.

* cited by examiner

METHOD AND A CONTROL UNIT FOR DETERMINING A PARAMETER INDICATIVE OF A ROAD CAPABILITY OF A ROAD SEGMENT SUPPORTING A VEHICLE

CROSS-REFERENCE TO RELATED APPLICATIONS

This application is a U.S. National Stage application of PCT/EP2019/058711, filed Apr. 5, 2019, and published on Oct. 8, 2020, as WO 2020/200483 A1, all of which is hereby incorporated by reference in its entirety.

TECHNICAL FIELD

The invention relates to a method for determining a parameter indicative of a road capability of a road segment supporting a vehicle. Moreover, the invention relates to a control unit for determining a parameter indicative of a road capability of a road segment supporting a vehicle. Furthermore, the invention relates to a vehicle.

The invention can be applied in heavy-duty vehicles, such as trucks, buses and construction equipment. Although the invention will be described with respect to an truck, the invention is not restricted to this particular vehicle, but may also be used in other vehicles such as buses and working machines.

BACKGROUND

When operating a vehicle, be it an autonomous vehicle or a manually operated vehicle, it may be beneficial to receive information indicative of the road capability of a road segment supporting the vehicle.

Purely by way of example, it may be desired to obtain information indicative of the friction between the road segment and ground engaging members of the vehicle. Such information can for instance be used for controlling the operation of the vehicle.

As another non-limiting example, it may be beneficial to obtain information relating to the load bearing capability of the road segment.

In order to determine a value indicative of a road surface friction coefficient, US 2015/0224925 A1 proposes a method in which a local coefficient of friction is merged with information received form inter alia a camera.

However, the above merger only provides reliable results when the local coefficient of friction is determined with an appropriately high reliability. Such a determination may require a change in the vehicle dynamics, such as an acceleration or a deceleration.

It is far from certain that such a change in the vehicle dynamics occurs in a situation when the need for the merger is high. As such, a problem with the method as presented in US 2015/0224925 A1 is that the merger need not necessarily provide useful merging results.

SUMMARY

An object of the invention is to provide a method for determining a parameter indicative of a road capability of a road segment supporting a vehicle, which method initiates a determination procedure for determining the parameter indicative of the road capability of the road segment supporting the vehicle at preferred time instants.

The object is achieved by a method according to claim 1.

As such, the present invention relates to a method for determining a parameter indicative of a road capability of a road segment supporting a vehicle. The vehicle comprises a sensor adapted to generate an information package on the basis of signals reflected from the surface of a portion of the road segment in front of the vehicle, as seen in an intended direction of travel of the vehicle. The vehicle further comprises a plurality of ground engaging members.

The method comprises:
determining a reference content measure indicative of the information content of an information package supplied by the sensor at a reference time instant;
comparing the reference content measure to a previous content measure indicative of the information content of an information package supplied by the sensor at a previous time instant, the previous time instant occurring before the reference time instant;
upon detecting that a difference between the reference content measure and the previous content measure is outside a predetermined tolerance range, allowing the execution of a determination procedure for determining the parameter indicative of the road capability of the road segment supporting the vehicle;
upon detecting that the difference between the reference content measure and the previous content measure is within the predetermined tolerance range, not allowing the execution of the determination procedure, and
wherein the determination procedure comprises modifying the operation of one or more of the ground engaging members.

By virtue of the above method, the determination procedure for determining the parameter indicative of the road capability of the road segment supporting the vehicle is allowed to be executed when an appropriately large difference is detected between the information package supplied by the sensor at a reference time instant and a previous time instant, respectively. Such a difference implies a change in the road condition which in turn may occasion that a determination procedure be allowed in order to enable that a new value of the parameter indicative of the road capability be determined.

As such, rather than using a scheme that executes the determination procedure on a regular basis, which scheme could result in a plurality of parameter values that are rather similar and thus do contribute to building up a reliable mapping of parameter values vis-à-vis e.g. the location of the vehicle or information packages generated by the sensor, the method of the present invention implies that a new parameter value is only allowed to be determined when a change in the information packages, such as images, generated by a sensor indicates that a change in parameter value is expected.

The above in turn implies that each new parameter value has a higher probability of contributing to an improved knowledge base for the relevant parameter.

Optionally, the information package comprises a colour image.

As used herein, the expression "colour image" relates to a digital image with a plurality of pixels wherein each pixel comprises colour information for each pixel. As such, each pixel of the digital image has three values/channels and each value/channel is a measure indicative of the intensity and chrominance of light.

The use of a colour image implies that different road types may be determined in a straightforward manner. For instance, the use of colour images makes it straightforward to distinguish between road segments comprising e.g. snow, asphalt and gravel.

Optionally, each one of the reference content measure and the previous content measure is determined on the basis of at least one of the following parameters: hue, saturation and lightness, for at least a portion of the colour image.

The use of the above parameters implies an expedient manner for distinguishing between different road types.

Optionally, each one of the reference content measure and the previous content measure is determined on the basis of at least one of the following parameters: hue, saturation and value, for at least a portion of the colour image.

Optionally, each one of the reference content measure and the previous content measure is determined on the basis of a plane in a space defined by hue, saturation and lightness or by hue, saturation and value.

Optionally, each one of the reference content measure and the previous content measure is determined on the basis of a histogram of oriented gradients for at least a portion of the colour image.

The use of the histogram of oriented gradients implies that an appropriate object detection may be performed using the images generated by the sensor. Such object detection may for instance be useful when detecting gravel in the road segment, which detection may indicate that the road segment is a gravel road, or when detecting patterns in the road segment—such as road marks—indicative of that the road segment comprises asphalt.

Optionally, the parameter indicative of the road capability of the road segment associated with the ground engaging member is a friction value between at least one of the ground engaging members and the road segment.

The friction value may instance be used for controlling the operation of the vehicle.

Moreover, it may be possible to identify a relatively strong correlation between the friction value and the reference content measure indicative of the information content of an information package supplied by the sensor.

Optionally, the parameter indicative of the road capability of the road segment associated with the ground engaging member is a load bearing capability value indicative of the load bearing capability of the ground segment supporting the vehicle.

Optionally, the determination procedure comprises imparting a torque to at least one of the ground engaging members. Imparting a torque to at least one of the ground engaging members may be perceived as disturbing for e.g. an operator of the vehicle since the vehicle dynamics may change as a result of the imparted torque. By virtue of the method according to the present invention, unnecessary execution of the determination procedure may be avoided. As such, the method may allow the impartment of a torque to one or more ground engaging members since such an impartment is likely to result in an improved mapping of the relevant parameter.

Optionally, the method further comprises determining how many times the determination procedure has been executed during a predetermined vehicle operation time range preceding a current time instant, the method further comprising: upon detecting that the determination procedure has been executed less than a predetermined threshold number of times during the predetermined vehicle operation time range and that the execution of the determination procedure is allowed, executing the determination procedure.

As used herein, the expression "vehicle operation time" relates to a time when the vehicle has been operating. Consequently, the term "predetermined vehicle operation time range" relates to a predetermined time range during which the vehicle has been operating.

As has been intimated hereinabove, the execution of the determination procedure may less desired from a vehicle operational point of view. As such, it may be preferred to limit the number of executions to a maximum number during a predetermined vehicle operation time range.

Optionally, the method further comprises associating the reference content measure to a road segment type of a set of predetermined road segment types.

Optionally, the method further comprises, when the determination procedure has been executed, associating the parameter indicative of the road capability of the road segment supporting the vehicle with the reference content measure.

A second aspect of the present invention relates to a control unit for determining a parameter indicative of a road capability of a road segment supporting a vehicle. The vehicle comprises a sensor adapted to generate an information package on the basis of signals reflected from the surface of a portion of the road segment in front of the vehicle, as seen in an intended direction of travel of the vehicle. The vehicle further comprises a plurality of ground engaging members.

The control unit is adapted to:
determine a reference content measure indicative of the information content of an information package supplied by the sensor at a reference time instant;
compare the reference content measure to a previous content measure indicative of the information content of an information package supplied by the sensor at a previous time instant, the previous time instant occurring before the reference time instant;
upon detecting that a difference between the reference content measure and the previous content measure is outside a predetermined tolerance range, allow the execution of a determination procedure for determining the parameter indicative of the road capability of the road segment supporting the vehicle;
upon detecting that the difference between the reference content measure and the previous content measure is within the predetermined tolerance range, not allow the execution of the determination procedure, and
wherein the determination procedure comprises modifying the operation of one or more of the ground engaging members.

Optionally, the information package comprises a colour image.

Optionally, each one of the reference content measure and the previous content measure is determined on the basis of at least one of the following parameters: hue, saturation and lightness, for at least a portion of the colour image.

Optionally, each one of the reference content measure and the previous content measure is determined on the basis of at least one of the following parameters: hue, saturation and value, for at least a portion of the colour image.

Optionally, each one of the reference content measure and the previous content measure is determined on the basis of a plane in a space defined by hue, saturation and lightness or by hue, saturation and value.

Optionally, each one of the reference content measure and the previous content measure is determined on the basis of a histogram of oriented gradients for at least a portion of the colour image.

Optionally, the parameter indicative of the road capability of the road segment associated with the ground engaging member is a friction value between at least one of the ground engaging members and the road segment.

Optionally, the parameter indicative of the road capability of the road segment associated with the ground engaging member is a load bearing capability value indicative of the load bearing capability of the ground segment supporting the vehicle.

Optionally, the determination procedure comprises imparting a torque to at least one of the ground engaging members.

Optionally, the control unit further is adapted to determine how many times the determination procedure has been executed during a predetermined vehicle operation time range preceding a current time instant, the control unit further being adapted to: upon detecting that the determination procedure has been executed less than a predetermined threshold number of times during the predetermined vehicle operation time range and that the execution of the determination procedure is allowed, issue a signal to execute the determination procedure.

Optionally, the control unit further is adapted to associate the reference content measure to a road segment type of a set of predetermined road segment types.

Optionally, the control unit further is adapted to, when the determination procedure has been executed, associate the parameter indicative of the road capability of the road segment supporting the vehicle with the reference content measure.

A third aspect of the present invention relates to a vehicle comprising a control unit according to the second aspect of the invention.

Optionally, the plurality of ground engaging members comprises one or more wheels.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will be described below for a vehicle in the form of a truck 10 such as the truck illustrated in FIG. 1. The truck 10 should be seen as an example of a vehicle which could comprise a control unit according to the present invention for which the method of the present invention could be carried out. However, the present invention may be implemented in a plurality of different types of vehicles. Purely by way of example, the present invention could be implemented in a truck, a tractor, a car, a bus, a work machine such as a wheel loader or any other type of construction equipment.

Figure 1:
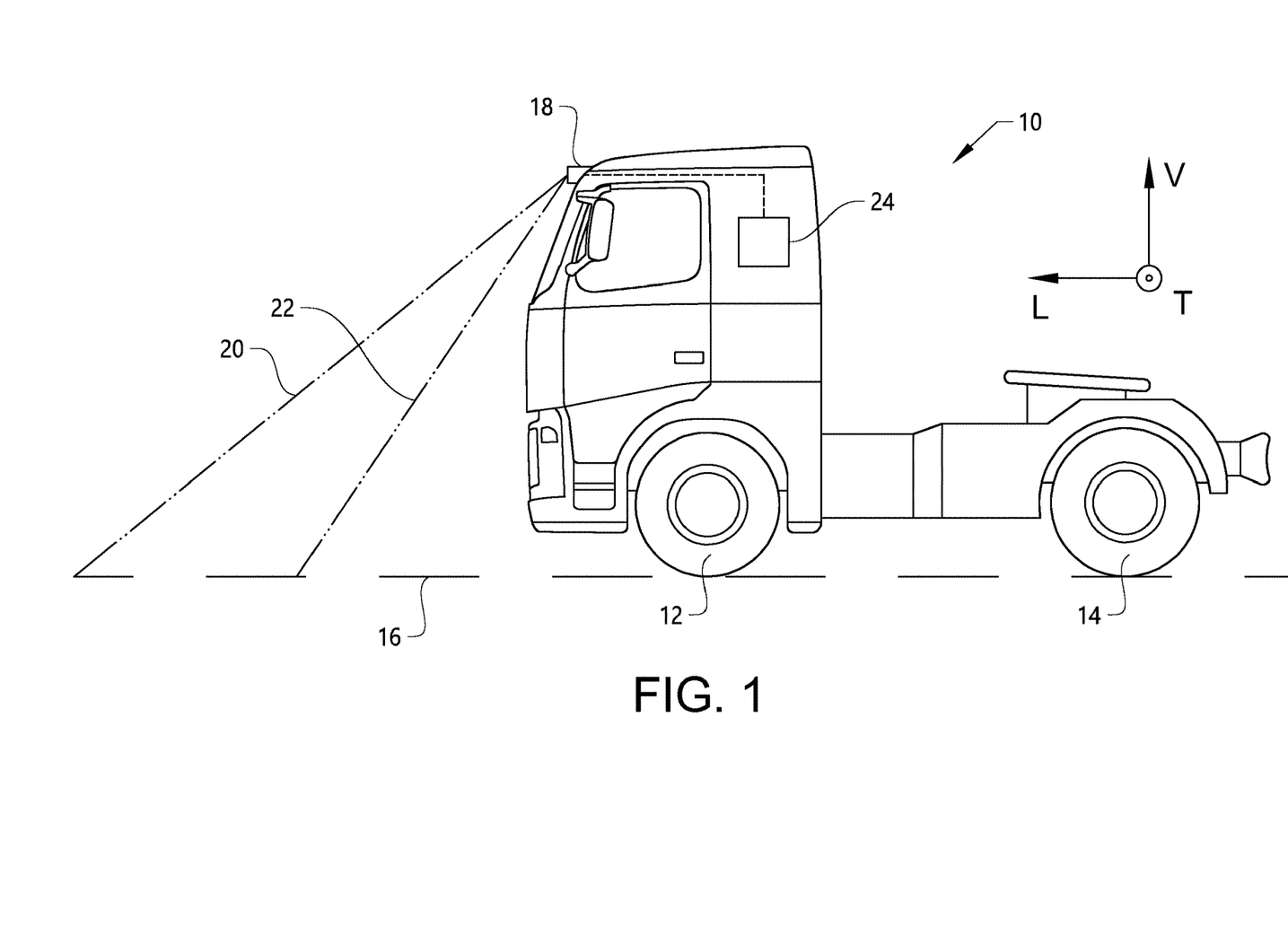
FIG. 1 is a schematic side view of a vehicle according to an embodiment of the present invention.

The FIG. 1 vehicle 10 comprises a set of ground engaging members 12, 14 each one of which being adapted to be supported by a ground segment 16. The ground engaging members 12, 14 are in FIG. 1 implemented as wheels but it is also envisaged that the ground engaging members may be of other types, such as crawlers or the like. Although the FIG. 1 embodiment of the vehicle 10 comprises a pair of front wheels 12 and a pair of rear wheels 14, it is of course envisaged that other embodiments of the vehicle 10 may comprise fewer or more wheels. In the below description, reference is generally made to only one front wheel 12 and only one rear wheel 14. However, it is to be understood that a reference to the front wheel 12 is equally applicable to the pair of front wheels. In a similar vein, a reference to the rear wheel 14 is equally applicable to the pair of rear wheels.

Additionally, FIG. 1 indicates that the vehicle extends in a longitudinal direction along a longitudinal axis L as well as in a vertical direction along a vertical axis V. The longitudinal axis L extends in a direction parallel to the intended direction of travel of the vehicle 10 and the vertical axis V extends in a direction being normal to the plane of the ground segment 16. FIG. 1 further illustrates that a transversal axis T extends perpendicular to each one of the longitudinal and vertical axes L, V.

FIG. 1 further illustrates that the vehicle 10 comprises a sensor 18 adapted to generate an information package on the basis of signals 20, 22 reflected from the surface of a portion of the road segment 16 in front of the vehicle 10, as seen in an intended direction of travel of the vehicle 10, i.e. as seen along the longitudinal axis L.

Purely by way of example, the sensor 18 may be a camera and the information package may be an image, preferably a digital image, of the surface of a portion of the road segment 16 in front of the vehicle 10. However, it is also envisaged that the sensor 18 may be implemented in other ways. Purely by way of example, the sensor 18 may comprise or be constituted by a LIDAR sensor, a RADAR sensor or the like.

FIG. 1 further illustrates a control unit 24 for determining a parameter indicative of a road capability of a road segment supporting a vehicle. In FIG. 1, the control unit 24 forms part of the vehicle 10. However, it is also envisaged that the control unit 24 may be separate from the vehicle 10 and for instance communicate with inter alia the sensor using wireless communication means (not shown in FIG. 1). Irrespective of the location of its location relative to the vehicle 10 and/or the sensor 18, the control unit 24 is preferably adapted to receive information from the sensor 18.

The control unit 24 is adapted to:
determine a reference content measure indicative of the information content of an information package supplied by the sensor 18 at a reference time instant $T_1$;
compare the reference content measure to a previous content measure indicative of the information content of an information package supplied by the sensor at a previous time instant $T_0$, the previous time instant $T_0$ occurring before the reference time instant $T_1$;
upon detecting that a difference between the reference content measure and the previous content measure is outside a predetermined tolerance range, allow the execution of a determination procedure for determining the parameter indicative of the road capability of the road segment 16 supporting the vehicle 10;

upon detecting that the difference between the reference content measure and the previous content measure is within the predetermined tolerance range, not allow the execution of the determination procedure, and wherein the determination procedure comprises modifying the operation of one or more of the ground engaging members 12, 14.

Figure 2:
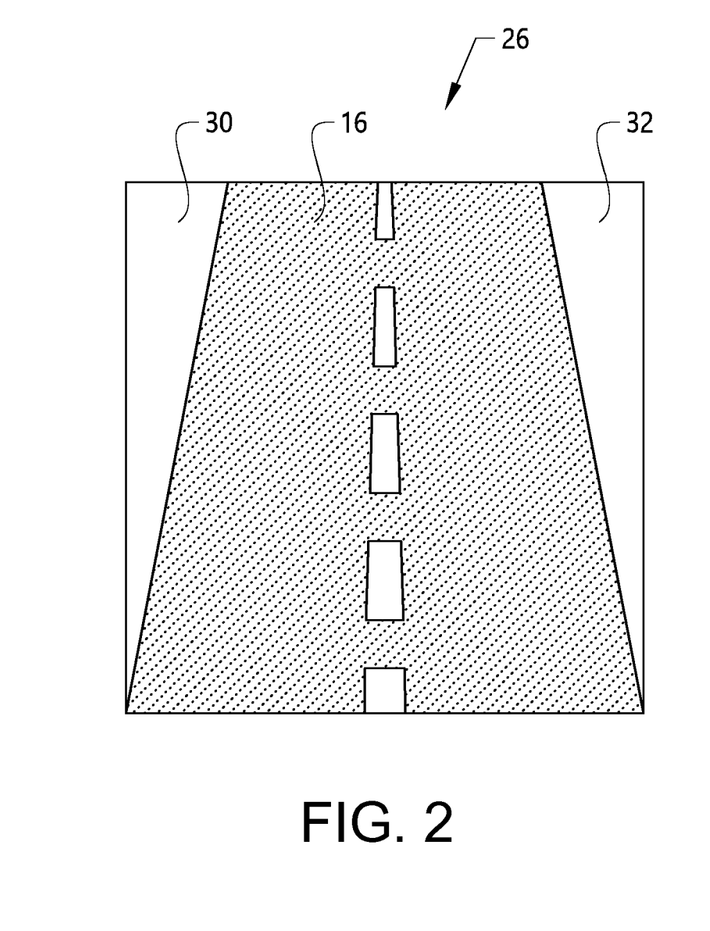
FIG. 2 illustrates a grey scale representation of a colour image supplied by a sensor at a previous time instant.

Purely by way of example, the information package comprises a colour image. To this end, FIG. 2 illustrates a grey scale representation of a colour image 26 supplied by the sensor at the previous time instant $T_0$. In a similar vein, FIG. 3 illustrates a grey scale representation of a colour image 28 supplied by the sensor at the reference time instant $T_1$.

As may be gleaned from FIG. 2, the colour image 26 illustrates a portion of the road segment 16 in front of the vehicle (not shown in FIG. 2). The FIG. 2 colour image 26 also illustrates areas 30, 32 surrounding the road segment 16.

Figure 3:
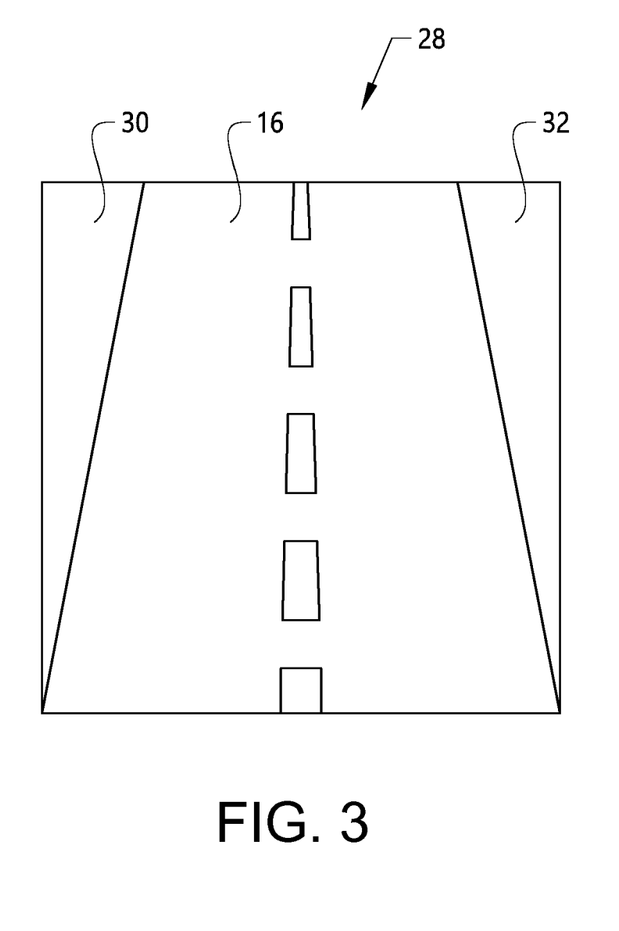
FIG. 3 illustrates a grey scale representation of a colour image supplied by a sensor at a reference time instant.

In a similar vein, the FIG. 3 colour image 28 illustrates a portion of the road segment 16 in front of the vehicle (not shown in FIG. 3). The FIG. 3 colour image 28 also illustrates areas 30, 32 surrounding the road segment 16.

As may be realized when comparing the FIG. 2 and FIG. 3 images, the road segment 16 in FIG. 3 is lighter than the FIG. 2 road segment 16. This may be an indication that the road condition has changed—for instance that the road segment 16 in FIG. 3 is covered by snow whereas the FIG. 2 road segment 16 is not—which in turn may trigger the determination procedure for determining the parameter indicative of the road capability of the road segment 16 supporting the vehicle 10.

As may be realized from the above, it may be preferred to use a content measure by which it is possible to determine whether e.g. the portion of the road segment 16 illustrated in each one of FIG. 2 and FIG. 3 are substantially the same or substantially different.

A few examples of such content measures are presented hereinbelow.

As a first example, each one of the reference content measure and the previous content measure is determined on the basis of at least one of the following parameters: hue, saturation and lightness, for at least a portion of the colour image. As has been intimated hereinabove, the portion of the colour image may preferably be a portion that is considered to represent a portion of the road segment 16.

In a similar vein as the colours red, green and blue can be regarded as generating a colour model—which may be referred to as the RGB colour model—the parameters hue H, saturation S and lightness L can be used for generating a colour model—which may be referred to as an HSL colour model—for defining colours and for distinguishing one colour from another.

Figure 4:
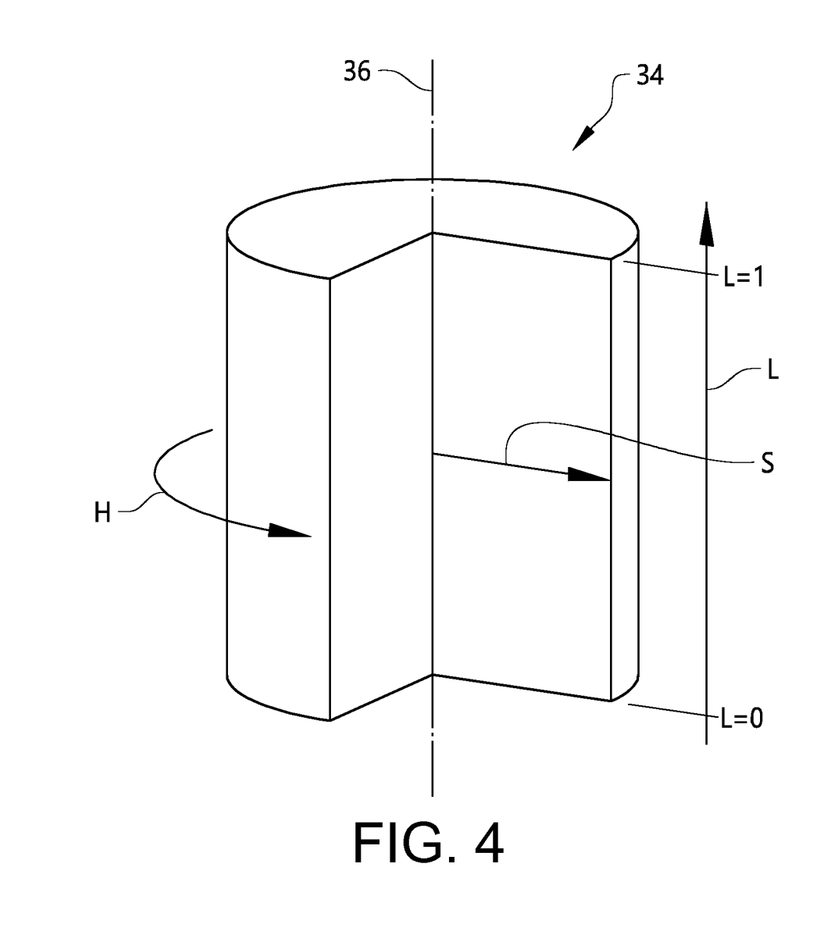
FIG. 4 shows a perspective view of a hue, saturation and lightness colour space illustrated as a cylinder.

The HSL colour model may be regarded as a cylindrical coordinate system wherein the hue H is the angular coordinate, the saturation S is the radial distance and the lightness L is the height. To this end, FIG. 4 illustrates an HSL cylinder 34 having a circular cross section where the hues H are represented by different positions around the circumference of any cross section through the cylinder 34. A hue can thus be expressed as a value from 0 to 360°, i.e. a value representing an angular position around a central line 36 of the cylinder 34. The outer circumference of the cylinder 34 thus can be seen to form a colour wheel using combinations of the colours red, green, blue and yellow around the cylinder's 34 circumference at a lightness value of 0.5, i.e. halfway up the cylinder 34.

The saturation S means the quantity of white that is added to the hue H. As may be gleaned from FIG. 4 the saturation S can be regarded as an axis extending radially in the HSL cylinder 34 and thus represent the radial distance in the cylinder 34. As a non-limiting example, a red colour—located at the circumference of the cylinder 34—is deemed to have a higher saturation that a pink colour—located within the cylinder 34—since the pink colour can be regarded as a mixture of red and white.

Finally, the lightness L comprises the grey colours and extends from black at lightness 0 (i.e. L=0, the bottom of the cylinder 34) to white at lightness 1 (i.e. L=1, the top of the cylinder 34).

Instead of using the HSL colour model, a model using the parameters hue H, saturation S and value V—a so called HSV colour model—may be used. The HSV colour model is similar to the HSL colour model although the value of the HSV colour model ranges from black at V=0 to saturated colours at V=1.

As may be realized from the above, the HSL colour model or the HSV colour model can be used in a plurality of ways for determining whether e.g. the portion of the road segment 16 illustrated by each one of FIG. 2 and FIG. 3 are substantially the same or substantially different. Put differently, each one of the HSL colour model or the HSV colour model can be used for determining the above-mentioned reference content measure and previous content measure.

Purely by way of example, the content measure may include the hue H. As such, the reference content measure may indicate a reference hue $H_1$ and the previous content measure may indicate a previous hue $H_0$. If the absolute value of the difference between the reference hue $H_1$ and the previous hue $H_0$ is greater than a predetermined hue difference threshold, this may for instance be an indication that the material type constituting the road segment 16 has changed from the previous time instant $T_0$ to the reference time instant $T_1$. For instance, an absolute value of a hue difference exceeding the predetermined hue difference threshold may be occasioned by the fact that the road segment 16 at the previous time instant $T_0$ was constituted by a first type of asphalt and that the road segment 16 at the reference time instant $T_1$ was a constituted by a second type of asphalt or even gravel. Such a detected change in road segment type may allow the execution of the above-mentioned determination procedure.

As another, non-limiting example, the content measure may include the saturation S. As such, the reference content measure may indicate a reference saturation $S_1$ and the previous content measure may indicate a previous saturation $S_0$. If the absolute value of the difference between the reference saturation $S_1$ and the previous saturation $S_0$ is greater than a predetermined saturation difference threshold, this may an indication of precipitation, e.g. snow or rain, which may again may allow the execution of the above-mentioned determination procedure.

In yet another, non-limiting example, the content measure may include the lightness L. As such, the reference content measure may indicate a reference lightness $L_1$ and the previous content measure may indicate a previous lightness $L_0$. If the absolute value of the difference between the reference lightness $L_1$ and the previous lightness $L_0$ is greater than a predetermined lightness difference threshold, this may an indication of changed lightning conditions, e.g. a changed level of sun radiation, between the reference time instant $T_1$ and the previous time instant $T_0$, which may again may allow the execution of the above-mentioned determination procedure.

For the HSV colour model, the value V may be used instead of the lightness L discussed in the previous paragraph.

As another example, each one of the reference content measure and the previous content measure is determined on the basis of a plane in a space defined by hue, saturation and lightness or by hue, saturation and value.

As yet another example, each one of the reference content measure and the previous content measure is determined on the basis of a histogram of oriented gradients for at least a portion of the colour image. The histogram of oriented gradients can be used for object detection. Relevant object types for the present invention may for instance be each one of the following: gravel, road marks, tracks in the road—such as tracks in a snowy road—or puddles. If one of the object type is detected at the reference time instant $T_1$ but not at the previous time instant $T_0$, this may be an indication that the road segment type has changed from the previous time instant $T_0$ to the reference time instant $T_1$ and such an indication may in turn allow the execution of the above-mentioned determination procedure. As such, in the above example, the content measure may comprise or even be constituted by a number indicating the number of objects of a certain type or class detected in an information package or image.

Irrespective of how it is determined that the execution of a determination procedure should be allowed, the determination procedure may be adapted to determine a parameter indicative of the road capability of the road segment 16 supporting the vehicle 10, which parameter may be relevant when operating the vehicle.

As a non-limiting example, the parameter indicative of the road capability of the road segment associated with the ground engaging member may be a friction value p between at least one of the ground engaging members 12, 14 and the road segment 16. Such a friction value p may be determined in a plurality of different ways. Purely by way of example, the friction value p may be determined by imparting the vehicle 10 a change in vehicle dynamics, such as a deceleration or an acceleration, and therefrom determine the friction value p. For instance, such a change in vehicle dynamics may comprise imparting a torque to at least one of the ground engaging members 12, 14.

As another non-limiting example, the parameter indicative of the road capability of the road segment 16 associated with the ground engaging member may be a load bearing capability value indicative of the load bearing capability—such as the stiffness—of the ground segment supporting the vehicle. As for the friction value p, the load bearing capability may be determined by imparting the imparting the vehicle 10 a change in vehicle dynamics, such as a change in the inclination of the vehicle, and thereafter determine the depression of one or more ground engaging members 12, 14 into the road segment 16.

As may be realized from the above, the determination procedure may result in a change in the vehicle dynamics which change may be undesired. As such, though purely by way of example, the control unit 24 may be adapted to determine how many times the determination procedure has been executed during a predetermined vehicle operation time range preceding a current time instant $T_1$. Moreover, the control unit 24 may further be adapted to: upon detecting that the determination procedure has been executed less than a predetermined threshold number of times during the predetermined vehicle operation time range and that the execution of the determination procedure is allowed, issue a signal to execute the determination procedure.

Thus, though purely by way of example, the control unit 24 may be adapted to only allow the execution of three determination procedures during four operating hours. As such, even though the comparison of the reference content measure and the previous content measure indicates that the execution of the determination procedure would be preferred, the control unit 24 may be adapted not to execute the determination procedure if three determination procedures already have been executed during the last four operating hours of a vehicle.

As has been intimated above, the control unit 24 may be adapted to associate the reference content measure to a road segment type of a set of predetermined road segment types. Purely by way of example, the set of predetermined road segment types may comprise the following types: asphalt, concrete or gravel.

Furthermore, the control unit 24 may be adapted to, when the determination procedure has been executed, associate the parameter indicative of the road capability of the road segment supporting the vehicle with the reference content measure.

The invention also relates to a method for determining a parameter indicative of a road capability of a road segment 16 supporting a vehicle 10. The vehicle 10 comprises a sensor 18 adapted to generate an information package on the basis of signals reflected from the surface of a portion of the road segment 16 in front of the vehicle 10, as seen in an intended direction of travel of the vehicle. The vehicle further comprises a plurality of ground engaging members 12, 14. A flow chart of an embodiment of the method according to the present invention is presented on FIG. 5.

Figure 5:
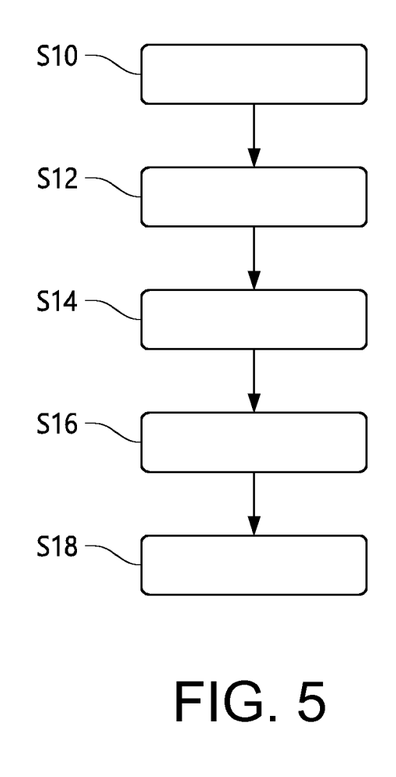
FIG. 5 is a flow chart illustrating an embodiment of a method according to the present invention.

With reference to FIG. 5, the method embodiment comprises:
- S10—determining a reference content measure indicative of the information content of an information package supplied by the sensor at a reference time instant $T_1$;
- S12—comparing the reference content measure to a previous content measure indicative of the information content of an information package supplied by the sensor at a previous time instant $T_0$, the previous time instant occurring before the reference time instant;
- S14—upon detecting that a difference between the reference content measure and the previous content measure is outside a predetermined tolerance range, allowing the execution of a determination procedure for determining the parameter indicative of the road capability of the road segment supporting the vehicle,
- S16—upon detecting that the difference between the reference content measure and the previous content measure is within the predetermined tolerance range, not allowing the execution of the determination procedure,
- S18—wherein the determination procedure comprises modifying the operation of one or more of the ground engaging members 12, 14.

The above method may for instance be carried out using the control unit 24 discussed hereinabove. However, it is also envisaged that the method according to the present invention may be carried out using other means.

It is to be understood that the present invention is not limited to the embodiments described above and illustrated in the drawings; rather, the skilled person will recognize that many changes and modifications may be made within the scope of the appended claims.

The invention claimed is:

1. A method for determining a parameter indicative of a road capability of a road segment supporting a vehicle, said vehicle comprising a sensor adapted to generate an information package on the basis of signals reflected from the surface of a portion of said road segment in front of the vehicle, as seen in an intended direction of travel of said vehicle, said vehicle further comprising a plurality of ground engaging members, said method comprising:
   determining a reference content measure indicative of the information content of an information package supplied by said sensor at a reference time instant;
   comparing said reference content measure to a previous content measure indicative of the information content of an information package supplied by said sensor at a previous time instant, said previous time instant occurring before said reference time instant;
   upon detecting that a difference between said reference content measure and said previous content measure is outside a predetermined tolerance range, allowing the execution of a determination procedure for determining said parameter indicative of said road capability of said road segment supporting said vehicle;
   upon detecting that said difference between said reference content measure and said previous content measure is within said predetermined tolerance range, not allowing the execution of said determination procedure, and
   wherein said determination procedure comprises modifying the operation of one or more of said ground engaging members.

2. The method according to claim 1, wherein said information package comprises a colour image.

3. The method according to claim 2, wherein each one of said reference content measure and said previous content measure is determined on the basis of at least one of the following parameters: hue, saturation and lightness, for at least a portion of said colour image.

4. The method according to claim 2, wherein each one of said reference content measure and said previous content measure is determined on the basis of at least one of the following parameters: hue, saturation and value, for at least a portion of said colour image.

5. The method according to claim 3, wherein each one of said reference content measure and said previous content measure is determined on the basis of a plane in a space defined by hue, saturation and lightness or by hue, saturation and value.

6. The method according to claim 2, wherein each one of said reference content measure and said previous content measure is determined on the basis of a histogram of oriented gradients for at least a portion of said colour image.

7. The method according to claim 1, wherein said parameter indicative of the road capability of the road segment associated with the ground engaging member is a friction value between at least one of said ground engaging members and said road segment.

8. The method according to claim 1, wherein said parameter indicative of the road capability of the road segment associated with the ground engaging member is a load bearing capability value indicative of the load bearing capability of said ground segment supporting said vehicle.

9. The method according to claim 1, wherein said determination procedure comprises imparting a torque to at least one of said ground engaging members.

10. The method according to claim 1, wherein said method further comprises determining how many times the determination procedure has been executed during a predetermined vehicle operation time range preceding a current time instant, said method further comprising: upon detecting that the determination procedure has been executed less than a predetermined threshold number of times during said predetermined vehicle operation time range and that the execution of said determination procedure is allowed, executing said determination procedure.

11. The method according to claim 1, wherein said method further comprises associating said reference content measure to a road segment type of a set of predetermined road segment types.

12. The method according to claim 1, wherein said method further comprises, when said determination procedure has been executed, associating said parameter indicative of said road capability of said road segment supporting said vehicle with said reference content measure.

13. A control unit for determining a parameter indicative of a road capability of a road segment supporting a vehicle, said vehicle comprising a sensor adapted to generate an information package on the basis of signals reflected from the surface of a portion of said road segment in front of the vehicle, as seen in an intended direction of travel of said vehicle, said vehicle further comprising a plurality of ground engaging members, said control unit being adapted to:
   determine a reference content measure indicative of the information content of an information package supplied by said sensor at a reference time instant;
   compare said reference content measure to a previous content measure indicative of the information content of an information package supplied by said sensor at a previous time instant, said previous time instant occurring before said reference time instant;
   upon detecting that a difference between said reference content measure and said previous content measure is outside a predetermined tolerance range, allow the execution of a determination procedure for determining said parameter indicative of said road capability of said road segment supporting said vehicle;
   upon detecting that said difference between said reference content measure and said previous content measure is within said predetermined tolerance range, not allow the execution of said determination procedure, and
   wherein said determination procedure comprises modifying the operation of one or more of said ground engaging members.

14. The control unit according to claim 13, wherein said information package comprises a colour image.

15. The control unit according to claim 14, wherein each one of said reference content measure and said previous content measure is determined on the basis of at least one of the following parameters: hue, saturation and lightness, for at least a portion of said colour image.

16. The control unit according to claim 14, wherein each one of said reference content measure and said previous content measure is determined on the basis of at least one of the following parameters: hue, saturation and value, for at least a portion of said colour image.

17. The control unit according to claim 15, wherein each one of said reference content measure and said previous content measure is determined on the basis of a plane in a space defined by hue, saturation and lightness or by hue, saturation and value.

18. The control unit according to claim 14, wherein each one of said reference content measure and said previous content measure is determined on the basis of a histogram of oriented gradients for at least a portion of said colour image.

19. The control unit according to claim 13, wherein said parameter indicative of the road capability of the road segment associated with the ground engaging member is a friction value between at least one of said ground engaging members and said road segment.

20. The control unit according to claim 13, wherein said parameter indicative of the road capability of the road segment associated with the ground engaging member is a load bearing capability value indicative of the load bearing capability of said ground segment supporting said vehicle.

21. The control unit according to claim 13, wherein said determination procedure comprises imparting a torque to at least one of said ground engaging members.

22. The control unit according to claim 13, wherein said control unit further is adapted to determine how many times the determination procedure has been executed during a predetermined vehicle operation time range preceding a current time instant, said control unit further being adapted to: upon detecting that the determination procedure has been executed less than a predetermined threshold number of times during said predetermined vehicle operation time range and that the execution of said determination procedure is allowed, issue a signal to execute said determination procedure.

23. The control unit according to claim 13, wherein said control unit further is adapted to associate said reference content measure to a road segment type of a set of predetermined road segment types.

24. The control unit according to claim 13, wherein said control unit further is adapted to, when said determination procedure has been executed, associate said parameter indicative of said road capability of said road segment supporting said vehicle with said reference content measure.

25. A vehicle comprising a control unit according to claim 13.

26. A vehicle according to claim 25, wherein said plurality of ground engaging members comprises one or more wheels.

* * * * *